United States Patent
Axelsson

(10) Patent No.: US 9,880,033 B2
(45) Date of Patent: Jan. 30, 2018

(54) AIR MASS FLOW SENSOR PIPE

(71) Applicant: Scania CV AB, Södertälje (SE)

(72) Inventor: Pål Axelsson, Tyresö (SE)

(73) Assignee: SCANIA CV AB (SE)

( * ) Notice: Subject to any disclaimer, the term of this patent is extended or adjusted under 35 U.S.C. 154(b) by 235 days.

(21) Appl. No.: 14/647,497

(22) PCT Filed: Nov. 6, 2013

(86) PCT No.: PCT/SE2013/051296
§ 371 (c)(1),
(2) Date: May 27, 2015

(87) PCT Pub. No.: WO2014/088487
PCT Pub. Date: Jun. 12, 2014

(65) Prior Publication Data
US 2015/0300855 A1    Oct. 22, 2015

(30) Foreign Application Priority Data

Dec. 4, 2012   (SE) ...................................... 1251367

(51) Int. Cl.
*G01F 1/684*   (2006.01)
*F02D 41/18*   (2006.01)
(Continued)

(52) U.S. Cl.
CPC ........... *G01F 1/6842* (2013.01); *F02D 41/18* (2013.01); *F15D 1/02* (2013.01); *G01F 15/00* (2013.01); *G01M 15/042* (2013.01)

(58) Field of Classification Search
CPC . F02D 41/18; F15D 1/02; G01F 15/00; G01F 1/6842; G01M 15/042
See application file for complete search history.

(56) References Cited

U.S. PATENT DOCUMENTS 3,722,275 A * 3/1973 Rodely ................. G01F 1/3209
                                                        123/198 R
3,965,730 A   6/1976 Innes .............................. 73/118
(Continued)

FOREIGN PATENT DOCUMENTS

EP       2 325 464 A2    5/2011

OTHER PUBLICATIONS

Korean Office Action, dated Sep. 21, 2016, issued in corresponding Korean Patent Application No. 10-2015-7014933. English translation. Total 10 pages.
(Continued)

*Primary Examiner* — Freddie Kirkland, III
(74) *Attorney, Agent, or Firm* — Ostrolenk Faber LLP

(57) ABSTRACT

An air mass sensor pipe (116) for a combustion engine includes an inlet opening (124) for air, an outlet opening (126) for air and an air mass sensor (118) arranged inside the pipe (116) between the inlet and outlet openings (124; 126). A first feed-through section (128) for the air is arranged upstream of the air mass sensor (118), the air mass sensor (118) is arranged in a second feed-through section (130) for the air, and that the first and second feed-through sections (128; 130) are displaced at an angle in relation to each other. Also a combustion engine which comprises such an air mass sensor pipe (116) is disclosed.

12 Claims, 7 Drawing Sheets

(51) Int. Cl.
*F15D 1/02* (2006.01)
*G01F 15/00* (2006.01)
*G01M 15/04* (2006.01)

(56) References Cited

U.S. PATENT DOCUMENTS

| | | | | |
|---|---|---|---|---|
| 4,624,134 A | 11/1986 | Nagano | ................ | 73/118.2 |
| 5,029,465 A * | 7/1991 | Tanimura | ................ | G01F 15/00 |
| | | | | 73/114.35 |
| 6,026,693 A * | 2/2000 | Baumoel | ................ | G01F 1/662 |
| | | | | 73/861.27 |
| 6,591,674 B2 * | 7/2003 | Gehman | ................ | G01F 1/6842 |
| | | | | 73/204.21 |
| 6,871,534 B1 * | 3/2005 | Hamada | ................ | F02D 41/185 |
| | | | | 73/202.5 |
| 7,533,579 B2 * | 5/2009 | Lewicke | ................ | G01F 1/3209 |
| | | | | 73/861.22 |
| 7,685,874 B2 * | 3/2010 | Nakano | ................ | G01F 1/6842 |
| | | | | 73/204.21 |
| 7,765,865 B2 * | 8/2010 | Ike | ................ | G01F 1/6845 |
| | | | | 73/204.22 |
| 7,946,186 B2 * | 5/2011 | Hoecker | ................ | G01F 1/3209 |
| | | | | 73/861.22 |
| 8,397,586 B2 * | 3/2013 | Sorenson | ................ | B01D 17/10 |
| | | | | 73/202.5 |
| 8,485,031 B2 * | 7/2013 | Speldrich | ................ | B01D 17/10 |
| | | | | 73/204.22 |
| 9,297,679 B2 * | 3/2016 | Furlong | ................ | F15D 1/02 |
| 9,372,106 B2 * | 6/2016 | Furlong | ................ | G01F 1/662 |
| 2002/0078744 A1 | 6/2002 | Gehman | ................ | 73/204.11 |
| 2004/0255660 A1 * | 12/2004 | Abdolhosseini | ................ | F02M 33/00 |
| | | | | 73/114.32 |
| 2008/0016959 A1 | 1/2008 | Nakano | ................ | 73/204.26 |
| 2009/0151472 A1 * | 6/2009 | Brown | ................ | G01F 1/662 |
| | | | | 73/861.27 |
| 2014/0238148 A1 * | 8/2014 | Priyadarshana | ................ | G01F 1/662 |
| | | | | 73/861.28 |

OTHER PUBLICATIONS

International Search Report dated Mar. 13, 2014 in corresponding PCT International Application No. PCT/SE2013/051296.

* cited by examiner

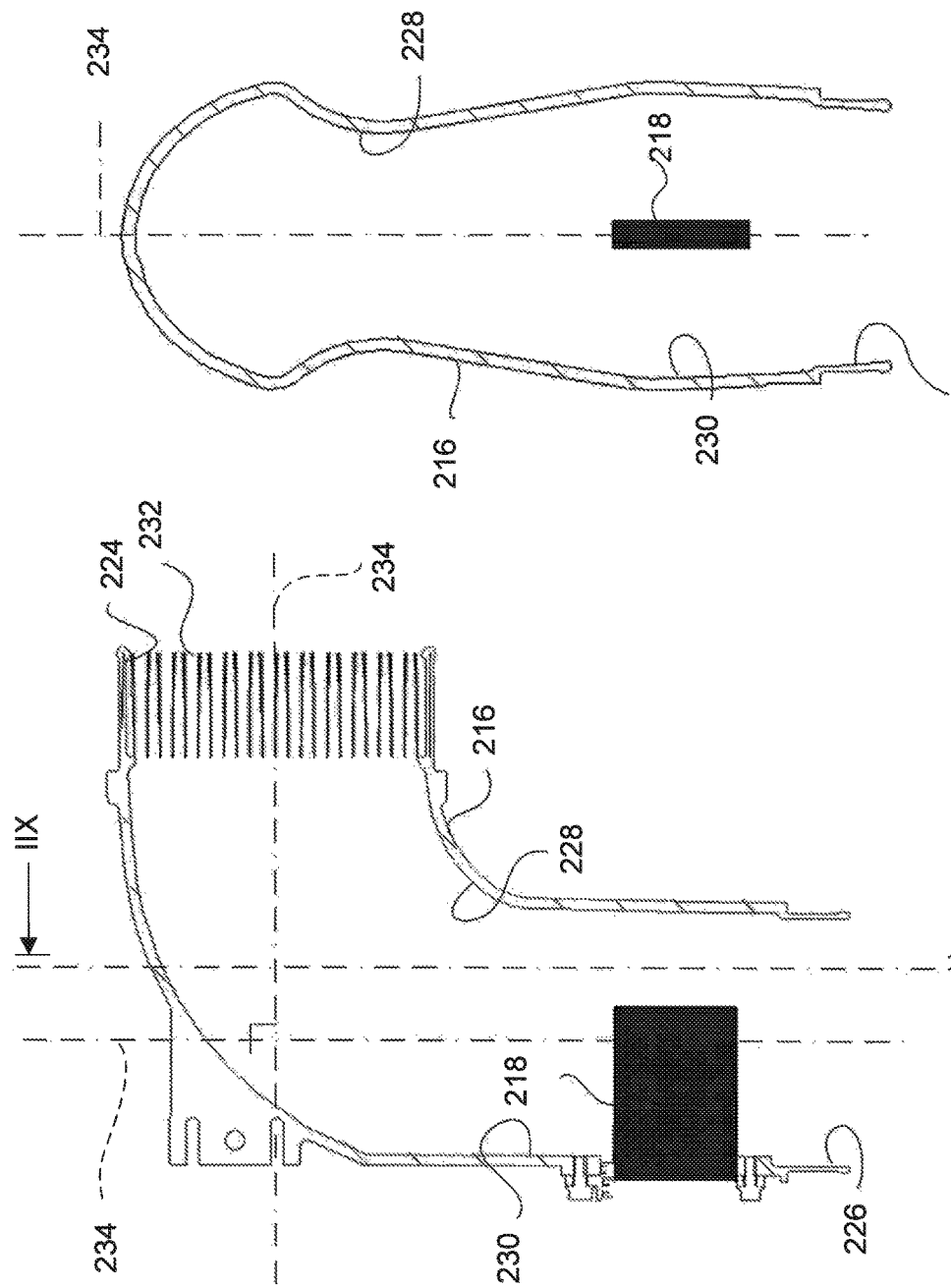

AIR MASS FLOW SENSOR PIPE

CROSS-REFERENCE TO RELATED APPLICATIONS

The present application is a 35 U.S.C. §§371 national phase conversion of PCT/SE2013/051296, filed Nov. 6, 2013, which claims priority of Swedish Patent Application No. 1251367-7, filed Dec. 4, 2012, the contents of which are incorporated by reference herein. The PCT International Application was published in the English language.

BACKGROUND AND PRIOR ART

The invention pertains to an air mass flow sensor pipe and to a combustion engine, which comprises such an air mass flow sensor pipe.

Mass air flow sensors are used to determine the air intake flow to a combustion engine, for example an engine in a vehicle or for industrial or marine purposes. It is very important to have knowledge of the current mass flow value of an air intake duct to the combustion engine, since this value is used in various calculations and modellings, which are carried out by one or several electronic control devices in the vehicle. The electronic control device emits signals to the combustion engine, so that it is driven optimally with respect to performance and emitted emissions. The air flow sensor may, however, generate mass flow values, which must be adjusted due to sensor-dependent characteristics or unique conditions for the current use.

At the installation of an air flow sensor in a combustion engine system it is thus important that a calibration of the air flow sensor is carried out at the installation, so that correct measuring values of the air mass flow is delivered to the control device.

Currently, an adjustment process is also applied for air flow sensors which takes place while driving, e.g. in heavy goods vehicles such as trucks and buses. In industrial or marine uses of the engine, the circumstances are usually more specific, which may entail that each engine requires individual adjustment at calibration. The mass flow values which are generated by such an air flow sensor are adjusted based on a correction factor. This adjustment procedure may be carried out more or less frequently during the operation of the engine.

Different types of installations entail different requirements in relation to the air flow sensor with respect to capacity, silencing and available space. Thus, different types of components and concepts have been developed to assemble air flow sensors in combustion engines.

U.S. Pat. No. 4,624,134 relates to an air flow sensor for a combustion engine in a vehicle. An air flow sensor is placed inside a bypass duct in a curved pipe, which is connected between an air intake and the combustion engine. This construction entails increased measuring accuracy of the air mass flow.

SUMMARY OF THE INVENTION

Despite prior art, there is a need to develop an air mass flow sensor pipe for easy and quick installation in different combustion engine systems without the need for calibration of an air mass sensor arranged inside the air mass sensor pipe. There is also a need to provide an air mass sensor pipe which may be installed in confined spaces, and thus requires little space while at the same time being easy and quick to install without any need for calibration of the air mass sensor.

The objective of the present invention is thus to provide an air mass sensor pipe, which is easy and quick to install.

Another objective of the invention is to provide an air mass sensor pipe in which an air mass sensor does not need to be calibrated at the installation.

Another objective of the invention is to provide an air mass sensor pipe which may be installed in confined spaces, and thus requires little space and in which the air mass sensor does not need to be calibrated at installation.

Another objective of the invention is to provide an air mass sensor pipe with small dimensions with which a careful measurement of the air mass flow through the pipe may be carried out.

With such an air mass sensor pipe it is possible to carry out a careful measurement of the air mass flow to the combustion engine without a special calibration process having to be carried out at the installation of the air mass sensor pipe in the combustion engine's intake system. Since the calibration process does not need to be carried out, the installation is easy to complete and may be completed in a short time. By designing the air mass sensor pipe with a first feed-through section for the air upstream of the air mass sensor, and by arranging the air mass sensor in a second feed-through section for the air, and by arranging the first and second feed-through sections at an angular offset relative to each other, the air mass sensor pipe may be designed with small dimensions. The air mass sensor pipe thus requires little space and may be installed in confined spaces.

The above objectives are achieved also with a combustion engine having the air mass sensor pipe disclosed herein.

Other features and advantages of the invention are set out in the example descriptions below.

BRIEF DESCRIPTION OF DRAWINGS

Below is a description, as an example, of preferred embodiments of the invention with reference to the enclosed drawings, on which:

FIG. 7 shows a cross-sectional view of the second embodiment of the air mass sensor pipe according to the present invention, and FIG. 8 shows a cross-sectional view of the second embodiment of the air mass sensor pipe according to the present invention, displaced by 90° relative to the cross-sectional view in FIG. 7 and along the line IIX-IIX in FIG. 7.

DETAILED DESCRIPTION OF PREFERRED EMBODIMENTS OF THE INVENTION

Figure 1:
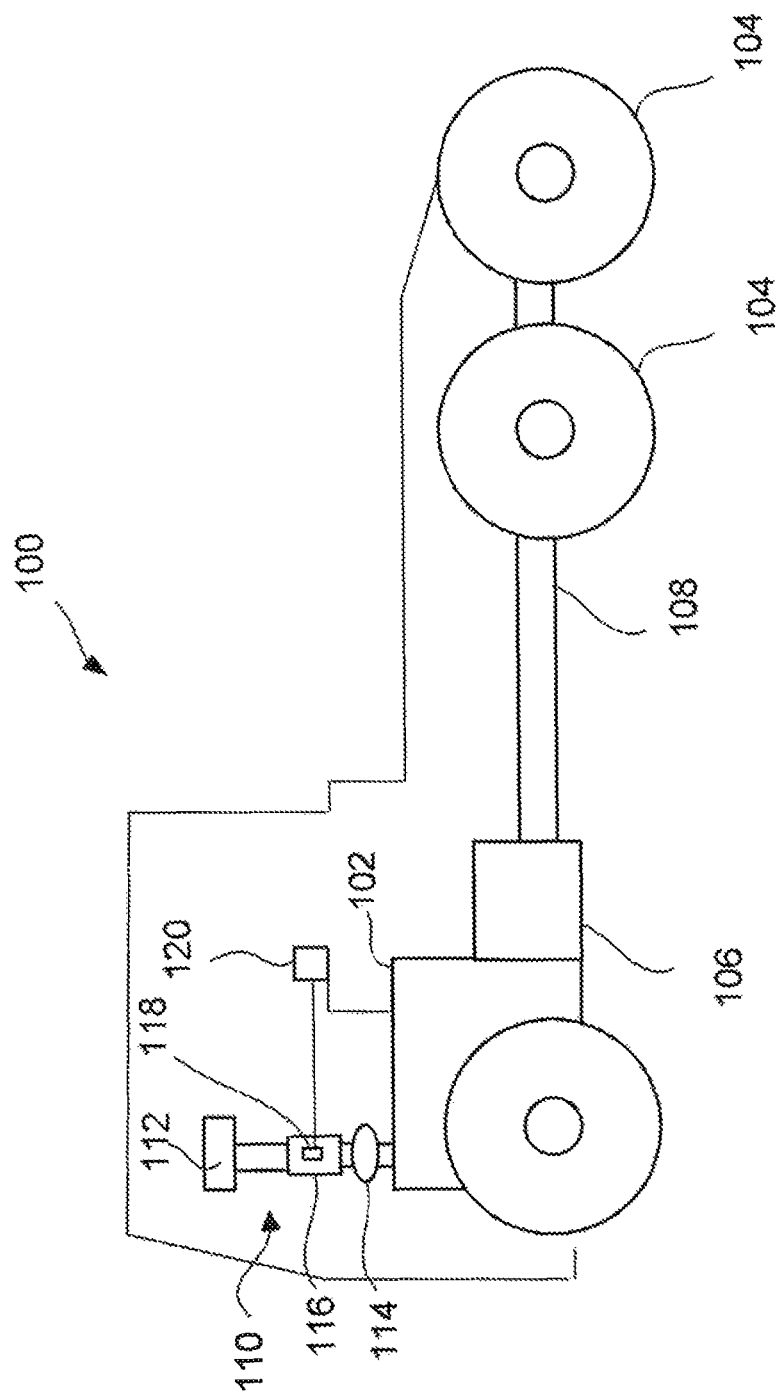
FIG. 1 shows a schematic side view of a vehicle with an air mass sensor pipe according to the present invention.

FIG. 1 shows a schematic side view of a vehicle 100, which is equipped with a combustion engine 102 for driving the vehicle. For this purpose, the vehicle comprises a conventional drive line which among elements comprises the vehicle 100's driving wheel 104, a gearbox 106 and a propeller shaft 108. The combustion engine 102 is equipped with an inlet system 110, which comprises an air filter 112, a turbocharger 114, and an air mass sensor pipe 116. In the inlet system 110 of the combustion engine 102, the air filter 112 is arranged upstream of the air mass sensor pipe 116 and the turbocharger 114 is arranged downstream of the air mass sensor pipe 116. The air mass sensor pipe 116 comprises an air mass sensor 118, which is connected to a control device 120. The control device 120 is also connected to the combustion engine 102 in order to control different parameters, such as fuel supply to the combustion engine 102.

Figure 2:
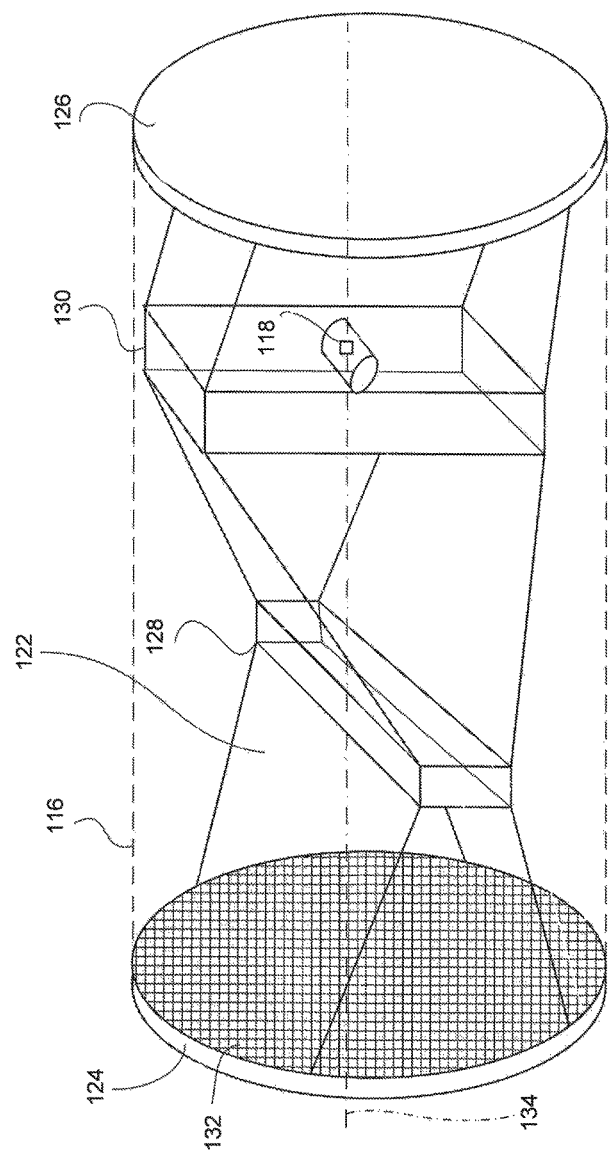
FIG. 2 shows a schematic perspective view of the geometrical design of the air duct in the air mass sensor pipe according to the present invention.

FIG. 2 shows a schematic perspective view of the geometrical design of the air duct 122 in the air mass sensor pipe 116. The air mass sensor pipe 116 comprises an inlet opening 124 for air, an outlet opening 126 for air and an air mass sensor 118 arranged in the pipe 116 between the inlet and the outlet openings 124, 126. The inlet and outlet openings 124, 126 have an essentially circular cross-sectional shape, which may easily be connected to the inlet system 110 of the combustion engine 102. The inlet and outlet openings 124, 126 may, however, have other cross-sectional shapes in order to adjust to the shape of the combustion engine's 102 inlet system 110.

A first feed-through section 128 for the air is arranged upstream of the air mass sensor 118. The air mass sensor 118 is arranged inside a second feed-through section 130 for the air. The first and second feed-through sections 128, 130 constitute a narrowing of the pipe 116. The first and second feed-through sections 128, 130 may have an essentially rectangular cross-sectional shape, but other cross-sectional shapes are also possible. The first and second feed-through sections 128, 130 are designed to control the air flow in the air duct 122 of the air mass sensor pipe 116 to the area where the air mass sensor 118 is located, so that the air passes the air mass sensor 118 with an essentially laminar air flow and with an air pressure which essentially corresponds to the atmospheric pressure.

An air control element 132 for laminar flow is arranged upstream of the first feed through section 128. The air control element 132 is preferably honeycomb-shaped, i.e. preferably designed with a honeycomb structure (i.e. with hexagonal cells in one plane and which extend perpendicularly toward this plane). Other shapes of the air control element 132 are also possible, such as a raster format. The air flow that passes the air control element 132 will be laminar and consolidated into a column shaped, laminar flow through the first feed-through section 128. The first and the second feed-through sections 128, 130 are rotationally displaced at an angle in relation to each other and preferably with an angular displacement which is essentially 90°. Thus, the air flow passing through the first feed-through section 128 will be expanded in one direction in order to be compressed at the same time in one direction, which is at an angular displacement of 90° in relation to the first direction. When the air thus passes the air mass sensor 118 arranged in the second feed-through section 130, the air flow is essentially laminar and the air pressure essentially corresponds to the atmospheric pressure. Through the first and the second feed-through sections 128, 130, the air has also been controlled to the area where the air mass sensor 118 is located. The definitions upstream and downstream are related to the direction of the air flow in the air duct 122 of the air mass sensor pipe 116 and in the inlet system 110 of the combustion engine 102.

Figure 3:
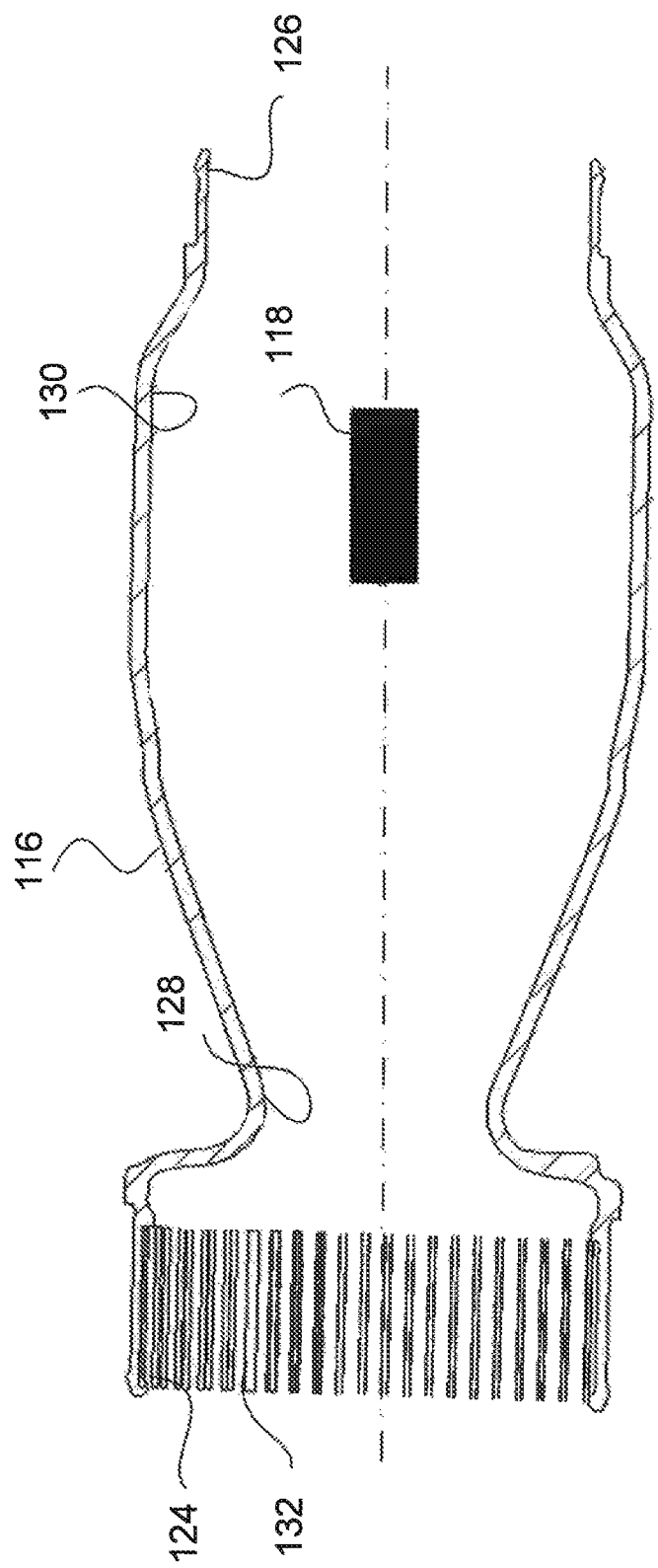
FIG. 3 shows a cross-sectional view of a first embodiment of an air mass sensor pipe according to the present invention.

FIG. 3 shows a cross-sectional view of a first embodiment of an air mass sensor pipe 116. According to the first embodiment, the inlet and outlet openings 124, 126 have a substantially coinciding center axis 134 (FIG. 2). The inlet and outlet openings 124, 126 have a substantially circular cross-sectional shape, which may easily be connected to the inlet system 110 of the combustion engine 102 through circular connection areas in the air mass sensor pipe 116. The cross section shows that the first feed-through section 128 constitutes a narrowing of the pipe 116. Since the first and the second feed-through sections 128, 130 are displaced at a rotational angle in relation to each other, and preferably with an angular displacement which is substantially 90°, FIG. 3 does not show that the second feed-through section 130 constitutes a narrowing. However, it does show that the air duct 122 expands in a direction toward the second feed-through section 130. The figure also shows that the air mass sensor 118 is arranged in the second feed-through section 130.

Figure 4:
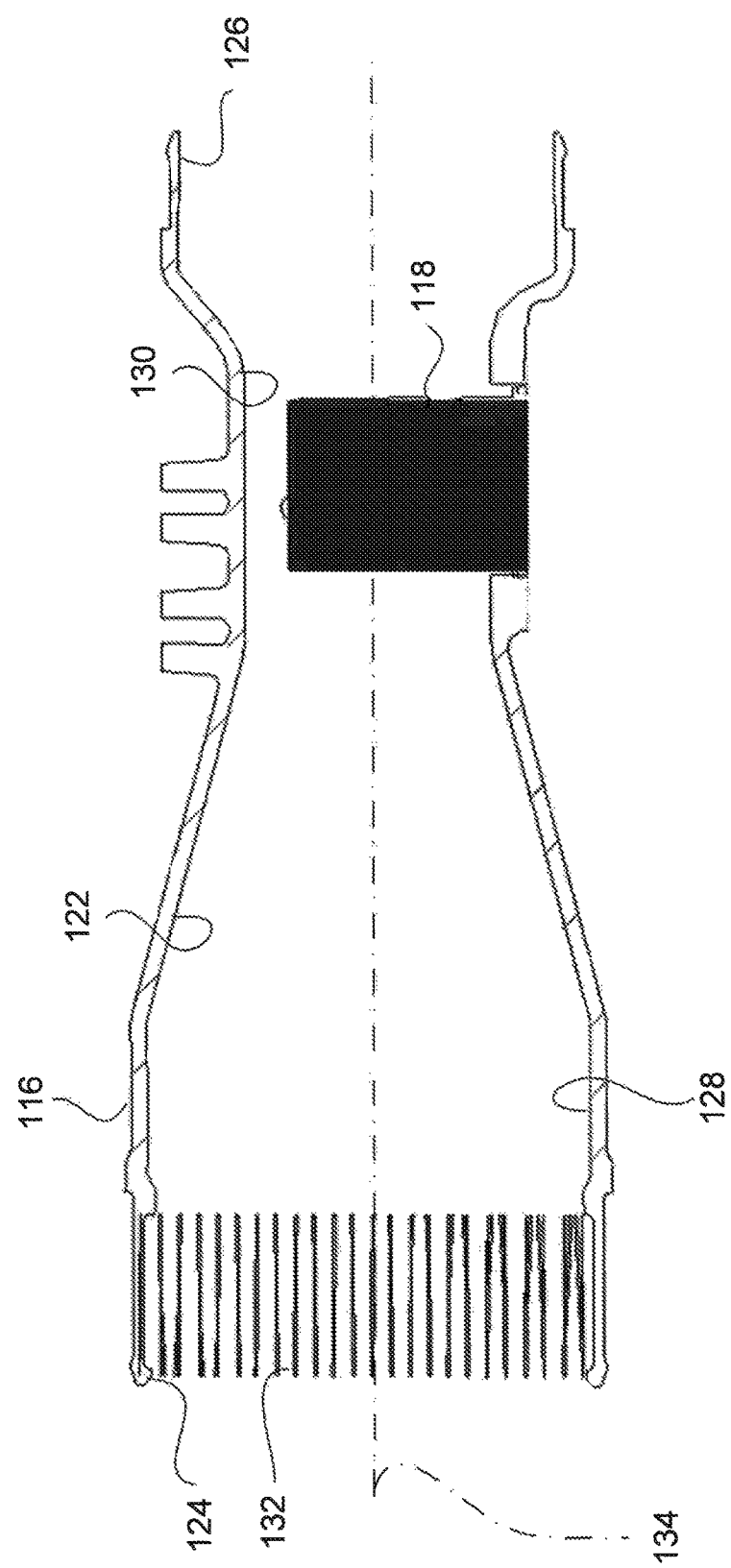
FIG. 4 shows a cross-sectional view of the first embodiment of the air mass sensor pipe according to the present invention, displaced by 90° relative to the cross-sectional view in FIG. 3.

FIG. 4 shows a cross-sectional view of the first embodiment of the air mass sensor pipe 116, displaced by 90° relative to the cross-sectional view in FIG. 3. This view shows how the air duct 122 converges in a direction toward the second feed-through section 130. Thus, the air flow passing through the first feed-through section 128 will be expanded in one direction at a right angle in relation to the central axis 134 of the pipe 116 in order to be compressed at the same time in one direction, at a right angle in relation to the pipe's central axis 134, the directions of which are at an angular displacement of 90° in relation to each other.

Figure 5:
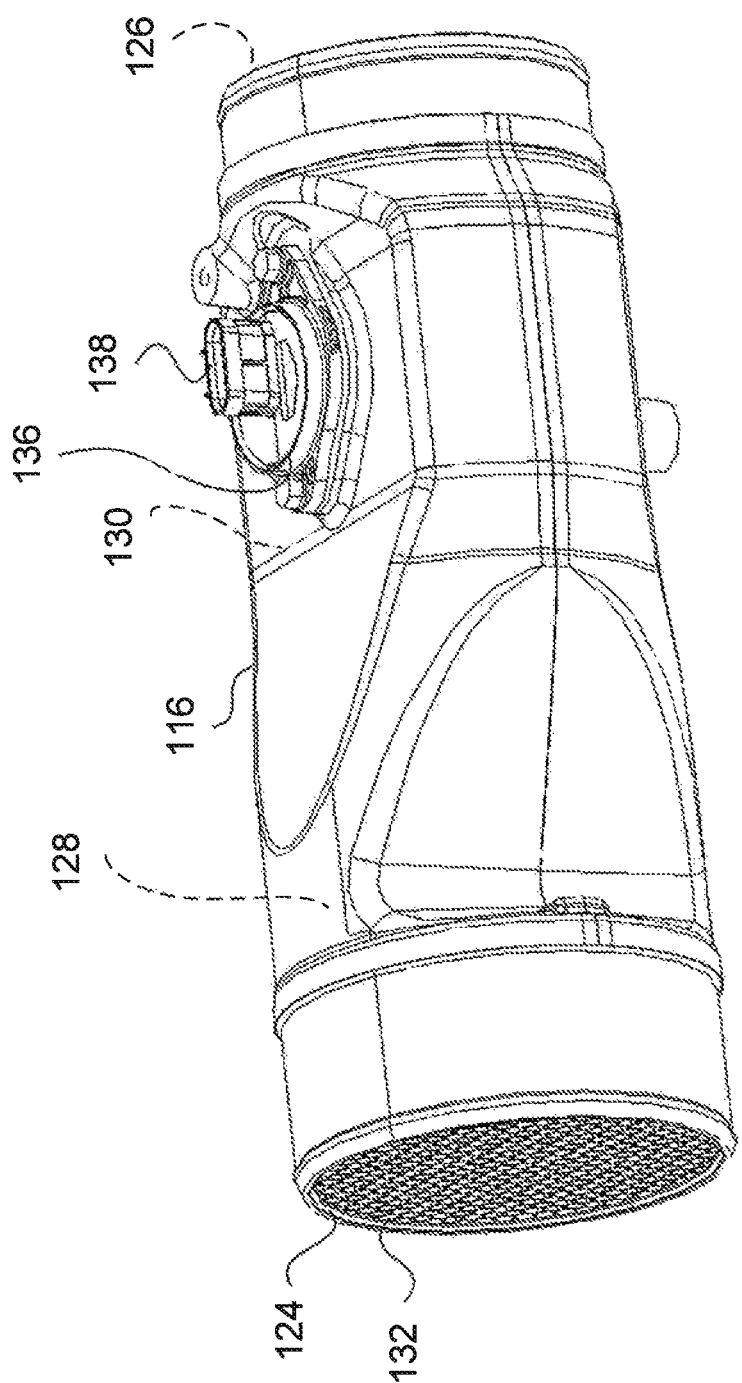
FIG. 5 shows a perspective view of the first embodiment of the air mass sensor pipe according to the present invention.

FIG. 5 shows a perspective view of the first embodiment of the air mass sensor pipe 116. The air control element 132 is arranged in the inlet opening 124. The air mass sensor pipe 116 has outer contours, which form the first and second feed-through sections 128, 130. The air mass sensor 118 is mounted in a side opening 136 in the air mass sensor pipe 116 at the second feed-through section 130, and on the exterior of the air mass sensor pipe 116 there is a connector 138 for connection to the control device 120.

Figure 6:
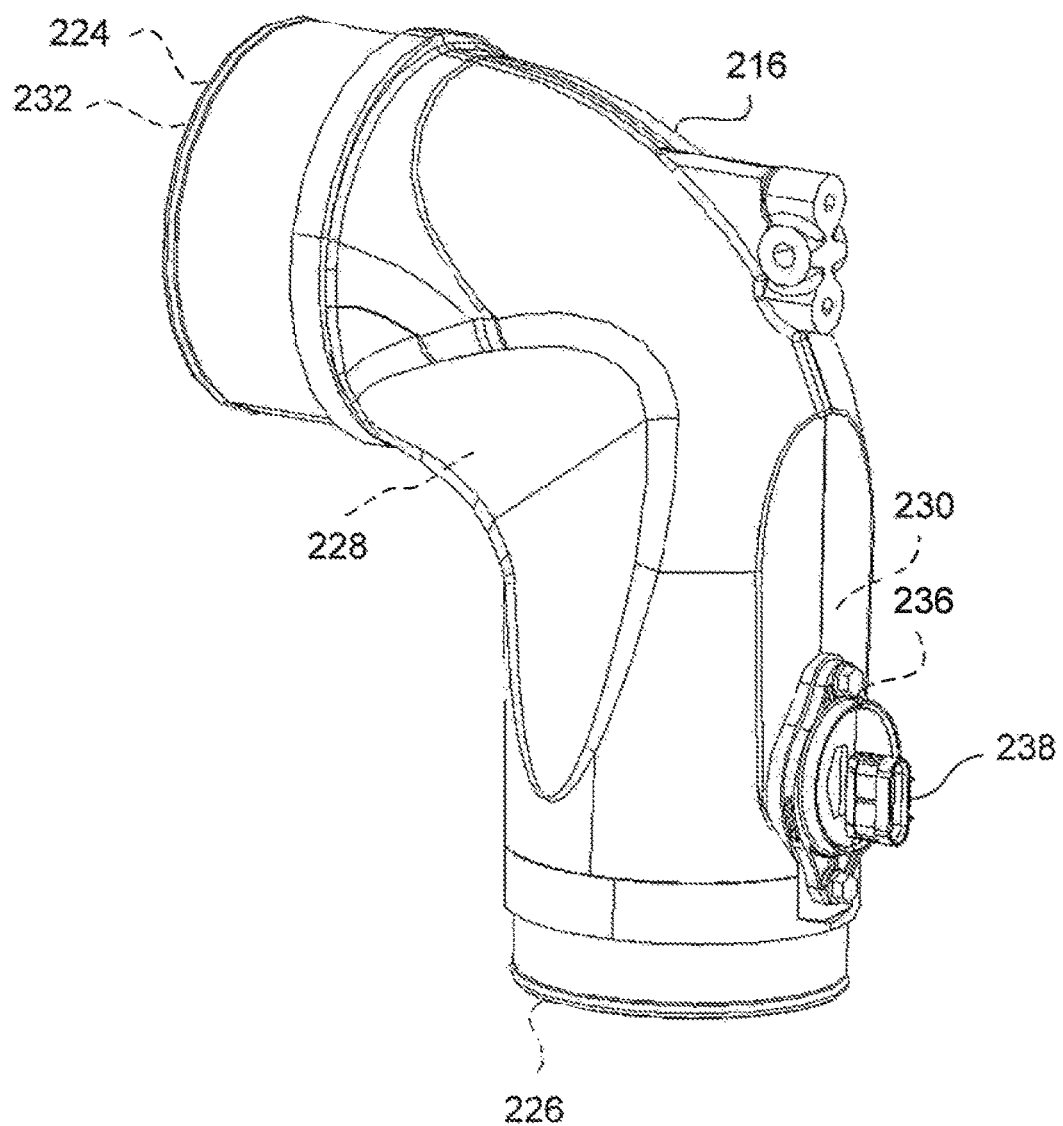
FIG. 6 shows a perspective view of a second embodiment of an air mass sensor pipe according to the present invention.

FIG. 6 shows a perspective view of a second embodiment of an air mass sensor pipe 216. According to the second embodiment, the inlet and outlet openings 224, 226 have substantially orthogonally-directed central axes 234, entailing that the air mass sensor pipe 216 may be adapted to an installation which requires a curved inlet system to the combustion engine 102. The air control element 232 is arranged in the inlet opening 224. The air mass sensor pipe 216 has outer contours which form the first and second feed-through sections 228, 230. The air mass sensor 218 is mounted in a side opening 236 inside the air mass sensor pipe 216 at the second feed-through section 230 and has, on the exterior of the air mass sensor pipe 216, a connector 238 for connection to the control device 120. As showed in FIG. 6, the inlet and outlet openings 224, 226 have substantially orthogonally-directed central axes 234. Other directions of the central axes 234 in the inlet and outlet openings 224, 226 are also possible, where the directions of the central axes 234 in the inlet and outlet openings 224, 226 differ from each other.

FIG. 7 shows a cross-sectional view of the second embodiment of the air mass sensor pipe 216. This shows that the inlet and outlet openings 224, 226 have substantially orthogonally-directed central axes 234. The inlet and outlet openings 224, 226 show an essentially circular cross-sectional shape, which may be easily connected to the inlet system 110 of the combustion engine 102 through circular connection areas in the air mass sensor pipe 216. The cross section shows that the second feed-through section 230 constitutes a narrowing of the pipe 216. Since the first and the second feed-through sections 228, 230 are displaced at an angle in relation to each other and preferably with an angular displacement which is essentially 90°, FIG. 7 does not show that the first feed-through section 228 constitutes a narrowing. The figure shows that the air mass sensor 218 is arranged in the second feed-through section 230.

FIG. 8 shows a cross-sectional view of the second embodiment of the air mass sensor pipe 216, displaced by 90° relative to the cross-sectional view in FIG. 7 and along the line IIX-IIX in FIG. 7. At the curved section of the air mass sensor pipe 216 there is a narrowing of the air duct, the narrowing of which constitutes the first feed-through section 228. This view shows how the air duct 222 expands in a direction toward the second feed-through section 230. Thus, the air flow passing through the first feed-through section 228 will be expanded in one direction at a right angle in relation to the central axis e3 of the pipe 216 in order to be compressed at the same time in another direction, at a right angle in relation to the central shaft 236 of the pipe 216, the directions of which are at an angular displacement of 90° in relation to each other. As shown in FIG. 8, the air duct 222 expands in a direction toward the second feed-through section 230.

The components and characteristics specified above may within the framework of the invention be combined between different embodiments specified.

The above description refers at least to some extent to an installation in a vehicle. The combustion engine and its components may analogously advantageously be used in other applications, for example for industrial or marine purposes.

The invention claimed is:

1. An air mass sensor pipe for a combustion engine, the air mass pipe comprising:
   a pipe having an inlet opening for inlet of air, and an outlet opening for outlet of air spaced along the pipe from the inlet opening;
   a first feed-through section for the air defining a first narrowing of the pipe;
   a second feed-through section for the air positioned downstream, in the air flow direction, of the first feed-through section, the second feed-through section defining a second narrowing of the pipe in a first direction at a first plane transverse to a central shaft of the pipe and defining an expansion of the pipe at the first plane,
   wherein the expansion of the pipe is displaced at a rotational angle with respect to the second narrowing; and
   the air mass sensor is located in the second feed through section.

2. A pipe according to claim 1, wherein the first and second feed-through sections each have a rectangular cross-sectional shape, which shape is longer in one direction and shorter in a transverse direction of the cross-section.

3. A pipe according to claim 2, wherein an angle of displacement between the first and the second feed-through sections is 90°.

4. A pipe according to claim 2, wherein the angle of displacement between the first and the second feed-through sections is 90°.

5. A pipe according to claim 1, wherein each of the inlet and outlet openings has a circular cross-sectional shape.

6. A pipe according to claim 1, further comprising an air control element configured for causing laminar air flow is located upstream of the first feed-through section.

7. A pipe according to claim 6, wherein the air control element is honeycomb-shaped for affecting passage of air therethrough.

8. A pipe according to claim 1, wherein the inlet opening and the outlet opening both have an orientation coinciding on a central shaft.

9. A pipe according to claim 1, wherein the inlet opening and the outlet opening have respective central shaft orientations and the directions of the orientation differ from each other.

10. A pipe according to claim 9, wherein the inlet opening and the outlet opening have orthogonally-directed orientation central shafts.

11. A combustion engine comprising an air mass sensor pipe according to claim 1.

12. A pipe according to claim 1, wherein the second narrowing is displaced at a rotational angle in relation to the first narrowing.

\* \* \* \* \*